United States Patent [19]

Suzuki et al.

[11] Patent Number: 4,611,269
[45] Date of Patent: Sep. 9, 1986

[54] APPARATUS AND METHOD IN WHICH A PLURALITY OF DETECTORS GENERATING SIGNALS WITH DIFFERENT PERIODS ARE USED TO DETECT THE ABSOLUTE POSITION OF A MOVING MEMBER

[75] Inventors: Kimio Suzuki, Numazu; Jitsuo Toda, Koganei; Wataru Shimizu, Fuchu, all of Japan

[73] Assignee: Toshiba Kikai Kabushiki Kaisha, Tokyo, Japan

[21] Appl. No.: 552,365

[22] Filed: Nov. 15, 1983

[30] Foreign Application Priority Data

Nov. 15, 1982 [JP] Japan .................................. 57-199882

[51] Int. Cl.[4] ..................... G05B 11/32; G05B 19/29
[52] U.S. Cl. ..................................... 364/174; 364/167; 318/602; 318/603; 318/661; 318/639; 340/347 SY
[58] Field of Search ..................... 364/174, 167, 561; 318/602, 601, 603, 639, 652, 661; 340/347 SY

[56] References Cited

U.S. PATENT DOCUMENTS 3,764,868 10/1973 O'Callaghan ....................... 318/602
4,330,752 5/1982 Rauskolb ............................ 364/174
4,342,077 7/1982 Passey et al. ........................ 364/174
4,377,847 3/1983 Daniel et al. ....................... 364/174
4,429,267 1/1984 Veale .................................. 318/603

Primary Examiner—Jerry Smith
Assistant Examiner—John R. Lastova
Attorney, Agent, or Firm—Cushman, Darby & Cushman

[57] ABSTRACT

An apparatus and a process for detecting an absolute positional value relating to mechanical movement of a member to be measured from a reference point. The apparatus includes a detecting means with a plurality of detectors having periods which are different from one another. Each detector generates an electric signal having a period corresponding to the movement of the member. The signals are stored in a memory. Then, the absolute value of mechanical movement between one of the detectors and the member is specified by using two values. The first value is derived by multiplying the period of the signal corresponding to the one detector by an integer N. The second value is stored in the memory and corresponds to the one detector's partial movement which is less than one period thereof. The value of the integer is decided by using periods and stored values corresponding to other detectors.

27 Claims, 19 Drawing Figures (a)      (b)

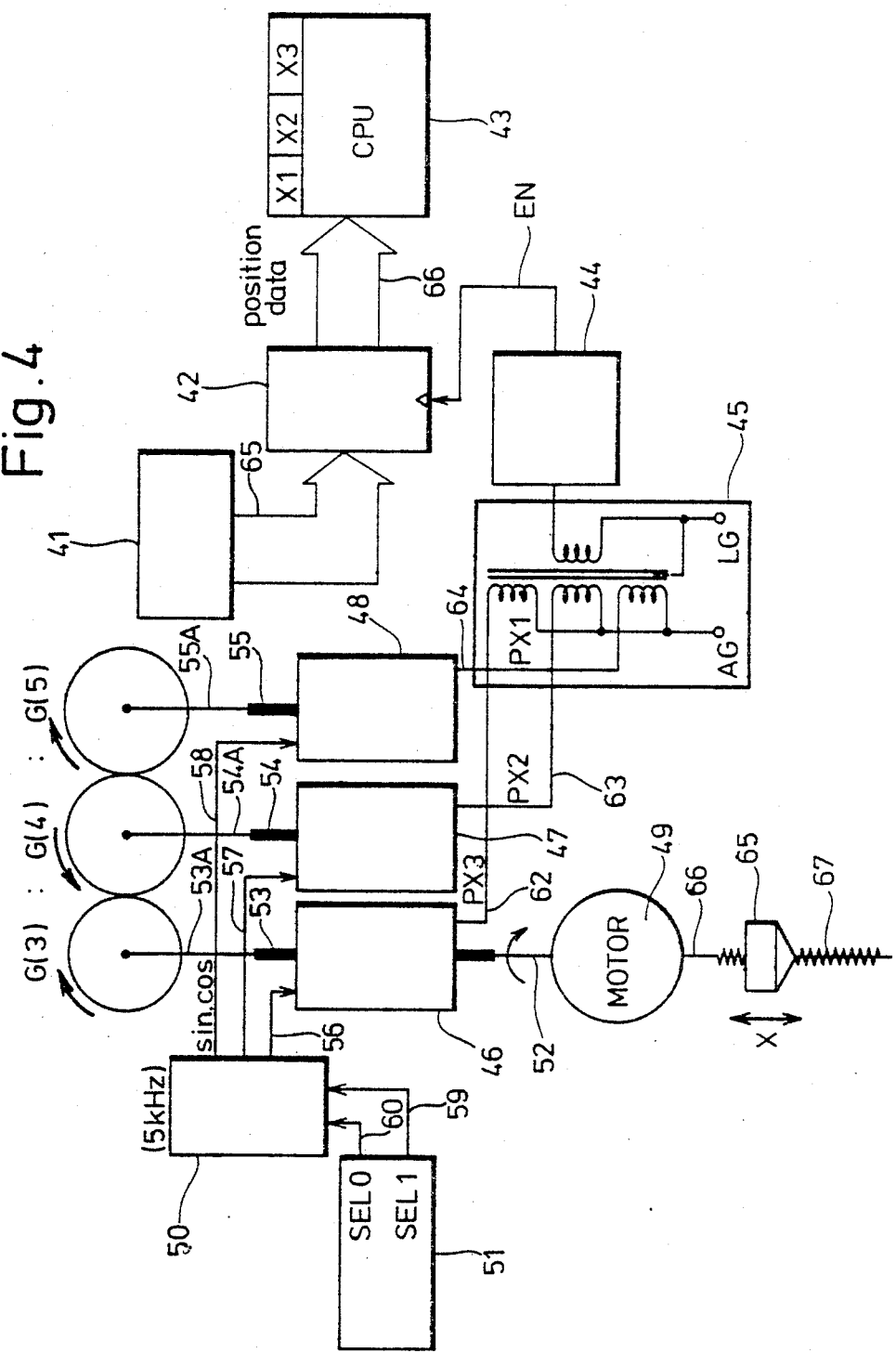

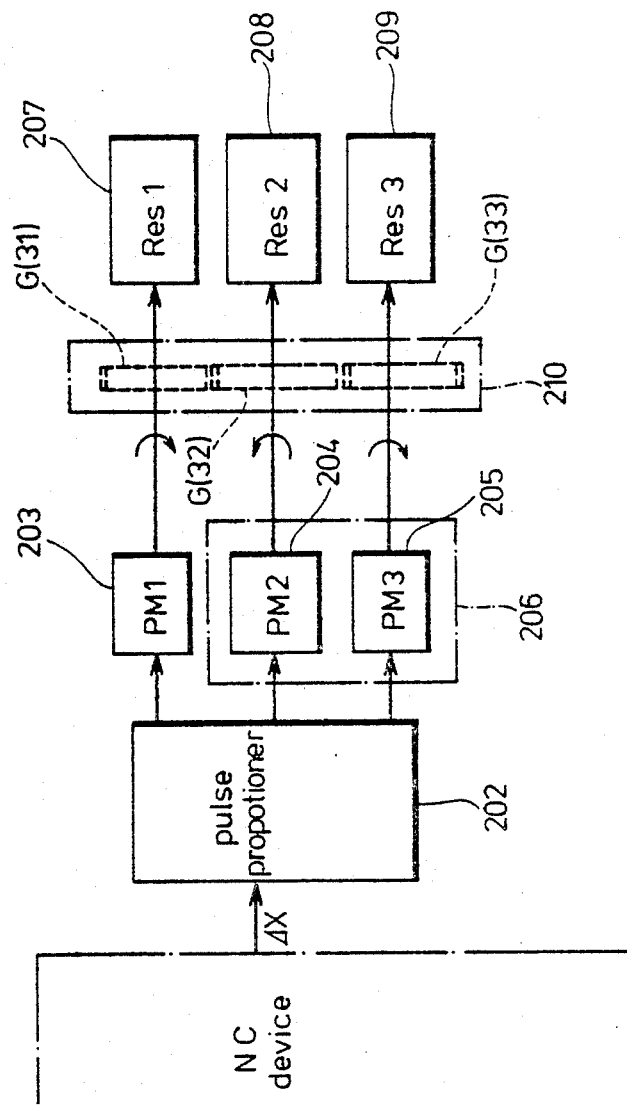

APPARATUS AND METHOD IN WHICH A PLURALITY OF DETECTORS GENERATING SIGNALS WITH DIFFERENT PERIODS ARE USED TO DETECT THE ABSOLUTE POSITION OF A MOVING MEMBER

BACKGROUND OF THE INVENTION

This invention relates to an apparatus and process for detecting an absolute position of an element, and more particularly to an apparatus and process for determining an absolute value by use of signals from a plurality of detectors.

In the prior art, for example, as disclosed in Japanese Kokai Tokkyo Koho No. 53-53350, a detector detecting an absolute position of an element on a machine tool, obtains an absolute value as follows. First, the number of rotations of the element in a direction of a coordinate axis, i.e. the X axis, is derived from a driving unit for the X axis direction and that number is supplied to a reduction train with two (2) stages or three (3) stages. A rotary detector is provided on a rotatable axle of each reduction stage so that a value within one revolution of the rotary detector is read out to obtain an absolute value from the combination of values detected by the rotary detectors. The combination of values above is performed as follows.

Suppose that a table of a machine tool is moved in the X axis direction. The number of revolutions derived from the X axis driving unit is reduced to 1/10 between the first axis and second axis of an X axis absolute position detecting unit. Further, the reduced number of revolutions is again reduced to 1/10 between the second axis and third axis thereof. Furthermore, the reduced number of revolutions is reduced to 1/10 between the third axis and fourth axis thereof. In this instance, the fourth axis rotates less than one revolution over all the length of all the measuring range in the X axis direction.

For example, suppose that the first axis rotates one revolution per 2 mm which is the movement of the table in the X axis direction. The movement of the table corresponding to each revolution of the fourth axis is as follows.

$$2 \times 10 \times 10 \times 10 = 2000 \text{ (mm)}$$

Therefore, the effective detecting range is 2 meters.

One revolution of the third axis corresponds to 200 mm in the movement of the table while one revolution of the second axis corresponds to 20 mm in the movement of the table.

Thus, in this case, an absolute value within 2000 mm of the table movement can be calculated from the sum of each value of the rotating angles within one revolution of the first, second, third and fourth axes.

However, the disadvantages concerning the above are:

(a) The reduction train becomes larger in size and its inertial moment increases as the effective measuring range is enlarged.

(b) The weighting factor for each value of the axes are different from each other. Thus, errors over one graduated scale on the fourth axis will be 1000 times greater in the first stage.

Accordingly, mechanical accuracy must always be maintained at a high degree even if vibration or wear occurrs in the machine tool during operation thereof.

SUMMARY OF THE INVENTION

It is a principal object of the present invention to provide an apparatus for detecting an absolute position in which a plurality of detectors each produces periodical electric signals in response to a predetermined mechanical movement of the member, the detectors having periods which are different from each other. Electric signals are obtained from the detecting means, which correspond to less than one period when the member is mechanically stopped. The signals thus obtained are digitally stored and an integral value is determined wherein a relative position between one of the detectors and the member is specified by a value multiplied by a value of integer N of the period corresponding to the one detector and a value of the less one period, and the integral value N is determined by using at least a period corresponding to another detector of the detecting means and the digital quantity stored in the storing means.

It is another object of the present invention to provide a process for detecting an absolute position which comprises the steps of preparing a detecting means with a plurality of detectors which provide periodical electric signals corresponding to predtermined mechanicl movements which are different from each other, to a member to be measured, generating the mechanical movement between the detecting means and the member, storing the electric signals corresponding to each the period of the detecting means, specifying a relative position involved in the mechanical movement between one of detectors of the detecting means and the member by using the value, multiplied by integer N, of the period corresponding to the one of detectors and the value which is less than the period, and choosing the integral value N by using a period corresponding to another detector of the detecting means and the stored value which is from another detector.

It is a further object of the present invention to provide a process for detecting an absolute position which comprises the steps of preparing a transmitting means of rotary type which includes a plurality of rotary detectors generating electric signals of which the period is due to a rotary angle range based on one revolution or equally-divided revolution thereof and axes rotating the detectors respectively at a predetermined ratio, connecting the rotary transmitting means to the member to be measured for mechanical movement thereof, supplying mechanical movement between the rotary detector and member to be measured under specified conditions, storing the electric signals corresponding to the respective period out of each detector, specifying a relative positional relationship between the member and one of the detectors involved in mechanical movement by using the value multiplied by integer N of the period corresponding to the one of the detector and the value which is less than one period thereof, and deciding the integral value N by using the period corresponding to another detector of the detectors and the stored value from the another detector.

The foregoing and, other objects, features and advantages of the invention will be apparent from the following more particular description of a preferred embodiment of the invention as illustrated in the accompanying drawings.

BRIEF DESCRIPTION OF THE DRAWINGS

FIG. 4 is a block diagram for an absolute position detecting apparatus including three (3) gears and resolvers, FIG. 16 is a diagram for still another embodiment of the present invention.

DETAILED DESCRIPTION OF THE INVENTION

Figure 1:
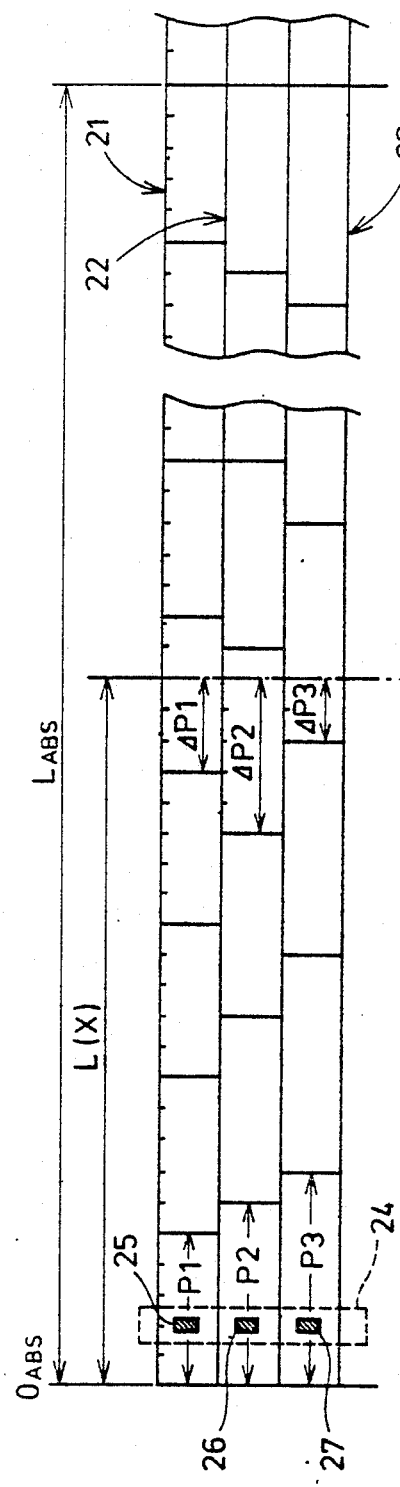
FIG. 1 is a diagram illustrating the principle of the present invention.

Referring to FIG. 1, reference numerals 21, 22 and 23 indicate one part of a detecting means, i.e. scales which are provided in parallel, respectively, in the X axis direction. The period of scale 21 is P1 which consists of five (5) graduated scales as one unit in the X axis direction. The period of scale 22 is P2 which consists of six (6) graduated scales as one unit in the X axis direction and the period of scale 23 is P3 which consists of seven (7) graduated scales as one unit in the X axis direction. A distance $L_{ABS}$ indicates an effective detecting range from the starting point $O_{ABS}$. In FIG. 1, all the periods of scales 21, 22 and 23 are consistent with each other at the point $L_{abs1}$ which is the next consistent point from the starting point $O_{ABS}$.

A detecting means 24 can move in the X axis direction, and supports detectors 25, 26 and 27. The detectors 25, 26 and 27 output electric signals as the waveforms 25a, 26a and 27a shown in FIG. 2. These waves correspond to the wave forms from a potentiometer of the rotary type as one example of an ideal detector.

Suppose that the central position of the detecting means 24 is at the point L(X) and each detector 25, 26 and 27 outputs values $\Delta P1$, $\Delta P2$ and $\Delta P3$, respectively, each of which values is less than one period of P1, P2 and P3. In FIG. 1, the distance L(X) is obtained by the following expressions.

$$L(X) = N1 \times P1 + \Delta P1 \quad (1)$$

$$L(X) = N2 \times P2 + \Delta P2 \quad (2)$$

$$L(X) = N3 \times P3 + \Delta P3 \quad (3)$$

Figure 2:
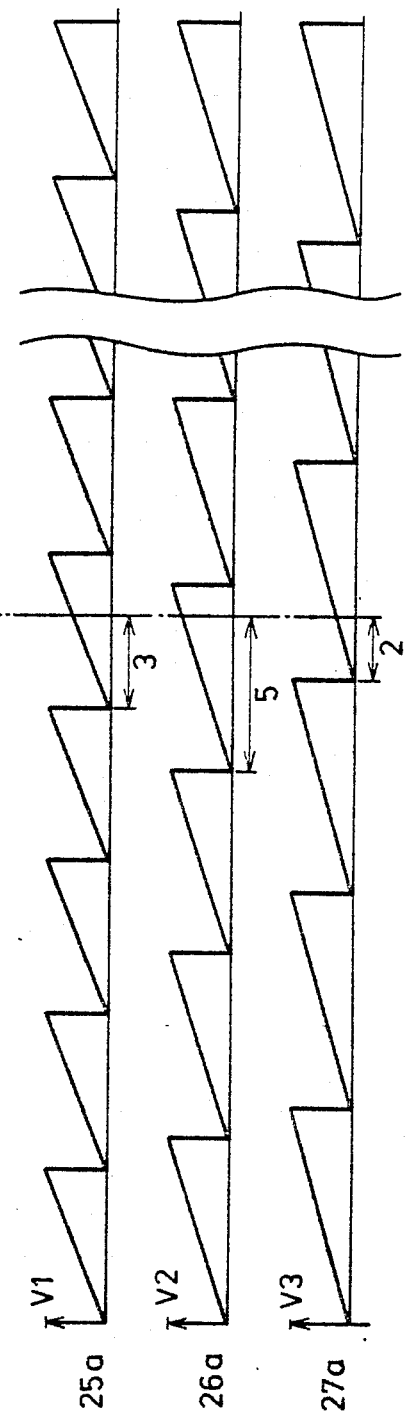
FIG. 2 is a diagram of waveforms from detectors corresponding to the period illustrated in FIG. 1.

In the expressions, the values P1, P2 and P3 are known amounts and the values $\Delta P1$, $\Delta P2$ and $\Delta P3$ are also measured values, i.e. known amounts. Thus, the corresponding value L(X) will be obtained where the value of integer 1, 2, 3, ... n is substituted for N1 in the expression (1), successively. After that, the values L(X) will be substituted into the expressions (2) and (3) in order to obtain the values j equal to the values N1. For instance, as shown in FIGS. 1 and 2, P1 is equal to five (5). P2 is equal to six (6) and P3 is equal to seven (7). On the other hand, the value $\Delta P1$ is equal to three (3), $\Delta P2$ is equal to five (5) and $\Delta P3$ is equal to two (2). The numerals 1,2,3,4 ... n are substituted for N1 successively in the expression (1).

Suppose that N1 is equal to the numeral 1, $$(LX) = 1 \times 5 + 3 = 8 \quad (4)$$

$$8 = N2 \times 6 + 5 \quad (5)$$

$$8 = N3 \times 7 + 2 \quad (6)$$

No integral numbers including zero (0), which are substituted for N2 and N3, can solve the expressions (5) and (6).

Thus, the value N1 cannot be 1.

Suppose that N1 is equal to the numeral 2, $$L(X) = 2 \times 5 + 3 = 13 \quad (7)$$

$$13 = N2 \times 6 + 5 \quad (8)$$

$$13 = N3 \times 7 + 2 \quad (9)$$

No integral numbers including zero (0), which are substituted for N2 and N3, can solve the expressions (8) and (9). Thus, the value N1 cannot be 2.

Suppose that N1 is equal to the numeral 3, $$L(X) = 3 \times 5 + 3 = 18 \quad (10)$$

$$18 = N2 \times 6 + 5 \quad (11)$$

$$18 = N3 \times 7 + 2 \quad (12)$$

No integrals N2 and N3 can solve the expressions (11) and (12).

Suppose that N1 is equal to the numeral 4, $$L(X) = 4 \times 5 + 3 = 23 \quad (13)$$

$$23 = N2 \times 6 + 5 \quad (14)$$

$$23 = N3 \times 7 + 2 \quad (15)$$

The expressions (14) and (15) are solved in this case, i.e. N2 is three (3) and N3 is three (3), as will be apparent from FIG. 1. Furthermore, the reason why only one group of N1, N2 and N3 exists for the combination of P1, P2 and P3 provided by the detecting means is illustrated below.

Figure 3:
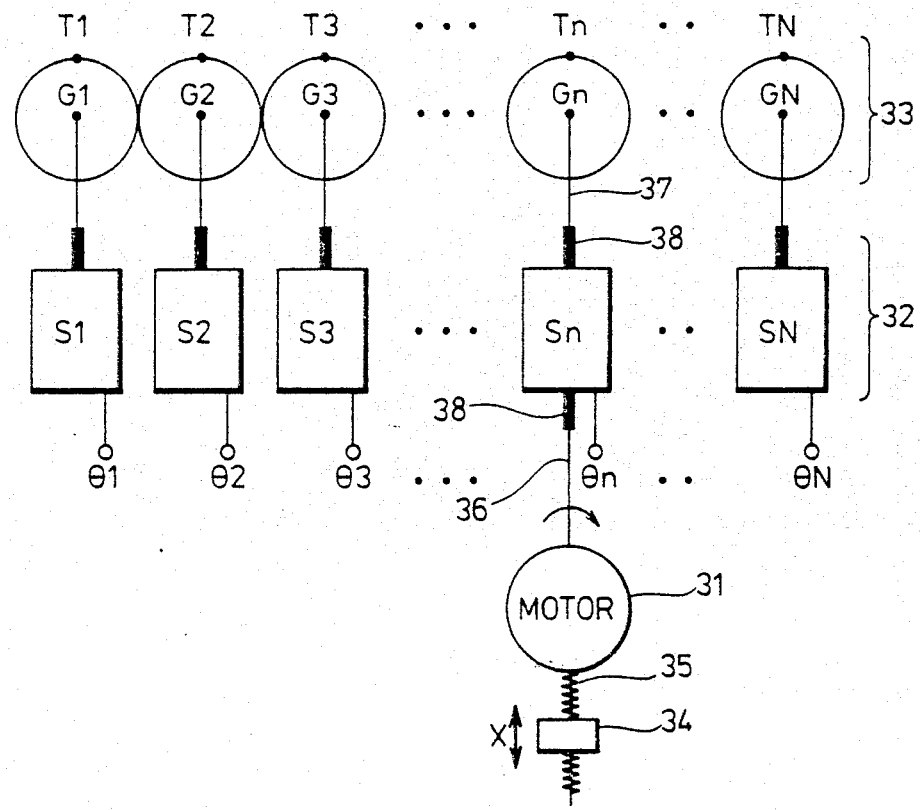
FIG. 3 is a diagram showing a layout of gear trains and a group of detectors which are of rotary type according to the present invention.

FIGS. 1 and 2 show a detecting means of the linear type which moves linearly with respect to the scales 21, 22 and 23 whereas the rotary type thereof is illustrated in FIG. 3 as an preferred embodiment. In FIG. 3, a motor 31 activates a driven member 34 which moves through a feed screw 35 in the X direction, shown as an arrow. An axle 36 extending from the driving motor 31 is connected with a rotary axle 38 of rotary detecting means Sn. The rotary axis 38 is connected to an axle 37 of a gear Gn in order to be rotated, gear Gn having Tn teeth. As illustrated in FIG. 3, the gears G1, G2, G3 ... Gn ... GN having teeth T1, T2, T3, ... Tn, ... TN, respectively, are engaged with each other to comprise a gear train. Detectors S1, S2, S3, ... Sn, ... SN output signals $\theta 1, \theta 2, \theta 3, \ldots \theta n, \ldots N$, respectively, which correspond to the rotating positions of rotary axles 38 of each detector. Suppose, in FIG. 3, the driven member 34 stays at a point in the X axis direction after rotation of the motor 31. The absolute value Pn of the position thereof will be found as follows where the detector Sn outputs the position data $\theta n$.

$$Pn = Rn \cdot \Delta + \theta n \tag{16}$$

In the expression (16), the symbol $\Delta$ indicates the moving degree of the driven member 34 in the X axis direction per revolution of the motor 31, the symbol Rn indicates the number of revolutions of the detector Sn from the reference point, which number is an integer. The symbol $\theta n$ corresponds to the rotating angle position which is less than one revolution of the rotary axle 38 of the detector Sn, that is, which corresponds to the displacement of the driven member 34 in the X axis direction. The number of revolutions of the motor 31 is transmitted to each detector Si ($i \neq n$) as well as detector Sn through the gear train 33. Thus, the following expression is solved.

$$\theta i = \frac{Tn}{Ti} \cdot Pn - iFiX\left[\frac{Tn}{Ti} \cdot Pn/\Delta\right] \cdot \Delta \tag{17}$$

where iFix [A] is the integral portion of symbol A. Furthermore, the sum of the teeth to be rotated until each gear G1, G2, ... GN reaches the same position is obtained by the following expression.

$$LCM\{K\}$$

Where the symbol K is equal to $\{Tj: j = 1, 2, \ldots N\}$ and the symbol LCM$\{K\}$ means the least common multiple of K.

The maximum number of effective revolutions Kn of detector Sn is defined by the following expression.

$$Kn = \frac{LCM\{K\}}{Tn} - 1 \tag{18}$$

Suppose that $\rho n$ is the solution of Rn in the expression (17), $$i(\neq n) \in \{1, 2, \ldots N\}, \rho n \in \{0, 1, 2, \ldots N\} \tag{19}$$

$$\theta i = \frac{Tn}{Ti}(\rho n \cdot \Delta + \theta n) - iFiX\left[\frac{Tn}{Ti}(\rho n \cdot \Delta + \theta n)/\Delta\right] \cdot \Delta$$

Only $\rho n$ exists in the above expression so that the value of $\rho n$ can be substituted into the following expression in order to obtain the absolute position Pn. That is, $$Pn = \rho n \cdot \Delta + \theta n \tag{20}$$

Furthermore, the effective detecting range i.e. the maximum position for detecting Pn (max) is determined by the following expression.

$$Pn(max) = Kn \cdot \Delta + \theta n(max) \tag{21}$$

In the expression, n(max) is the maximum value detected by detector Sn. The expression (21) means that the value will vary linearly with the position Pn(max) according to the number of revolutions of gear G(n).

As to the preferable selection for the number of teeth, (a) Elements (the number of teeth) of the set K should not have any common factors, and (b) Pn(max) becomes larger where the number of teeth Tn of the gear G(n) connected to the detector Sn is the minimum in the set K.

In view of the above (a) and (b), the expression (18) will be converted to the following expression.

$$Kn = \frac{\prod_{J=1}^{N} TJ}{Tn} \tag{22}$$

$$Tn \leq Ti \in K \tag{23}$$

As the gears G(l) and G(m) are selected to have the relationship of a prime number to each other, the following expression is not solved.

$$Tl = M \cdot Tm \quad (M: \text{a positive integer})$$
$$Tl, Tm \in K$$

Furthermore, the reason why only $\rho n$ exists in the expression (19) is illustrated as follows.

In FIG. 3, the effective rotating number En of detector Sn is solved by the following expression.

$$En = \frac{LCM\{K\}}{Tn} \tag{24}$$

Where $En = Kn + 1$.

That is, En effective rotating numbers exist which can satisfy the value $\theta n$ in the expression 16.

In view of the expressions (16) and (17), suppose that Rn is, as a solution, equal to $\rho_n^1$ where i is equal to 1. The following expression will be established.

$$\theta l = \frac{Tn}{Tl}(\rho_n^1 \cdot \Delta + \theta n) - iFiX\left[\frac{Tn}{Tl}(\rho_n^1 \cdot \Delta + \theta n)/\Delta\right] \cdot \Delta \tag{25}$$

Suppose that $E_n^1$ which corresponds to $\rho_n^1$ and $Rn = \rho_n^1 + E_n^1$ is substituted for the right portion of the expression (17). Thus, the right portion of the expression (17) is equal to the following expression.

The right portion of expression (17)=

$$\frac{Tn}{T1}\{(\rho_n^1 + E_n^1)\cdot \Delta + \theta n\} -$$

$$iFiX\left[\frac{Tn}{T1}\{(\rho_n^1 + E_n^1)\cdot \Delta + \theta n\}/\Delta\right]\cdot \Delta$$

$$= \frac{Tn}{T1}(\rho_n^1 \cdot \Delta + \theta n) + \frac{Tn}{T1}\cdot E_n^1 \cdot \Delta -$$

$$iFiX\left[\frac{Tn}{T1}(\rho_n^1 \cdot \Delta + \theta n)/\Delta + \frac{Tn}{T1}\cdot E_n^1\right]\cdot \Delta$$

$$= \frac{Tn}{T1}(\rho_n^1 \cdot \Delta + \theta n) - iFiX\left[\frac{Tn}{T1}(\rho_n^1 \cdot \Delta + \theta n)/\Delta\right]\cdot \Delta +$$

$$\frac{Tn}{T1}\cdot E_n^1 \cdot \Delta - iFiX\left[\frac{Tn}{T1}\cdot E_n^1\right]\cdot \Delta$$

$= \theta l$ (refer to the expression (25))
$=$ the left portion of the expression (17)

where the element $Tn/T1 \cdot E_n^1$ is an integer and $E_n^1$ is equal to $LCM\{Tn, T1\}/Tn$.

Thus, possible Rn's which can satisfy the expression (17) are $1/E_n^1$ in toto. Similarly, suppose, i is equal to 2, 3, ..., n−1, n+1, ..., N, respectively, $$\frac{1}{E_n^2}, \frac{1}{E_n^3}, \ldots, \frac{1}{E_n^{n-1}}, \frac{1}{E_n^{n+1}}, \ldots \frac{1}{E_n^N}$$

From the above, for all the cases where i is equal to 1, 2, 3, ..., n−1, n+1, ... N, the capability to satisfy the expression (16) and (17) is indicated by the following expression.

$$\frac{En}{LCM(E_n^1, E_n^2, \ldots E_n^{n-1}, E_n^{n+1}, \ldots E_n^N)}$$

$$= \frac{\frac{LCM(K)}{Tn}}{LCM\left(\frac{LCM(Tn, T1)}{Tn}, \frac{LCM(Tn, T2)}{Tn}, \ldots, \frac{LCM(Tn, TN)}{Tn}\right)}$$

$$= \frac{\frac{LCM(T1, T2, \ldots TN)}{Tn}}{\frac{1}{Tn}LCM\{LCM(Tn, T1), LCM(Tn, T2), \ldots LCM(Tn, TN)\}}$$

$$= \frac{LCM(T1, T2, \ldots TN)}{LCM\{LCM(Tn, T1), LCM(Tn, T2), \ldots LCM(Tn, TN)\}} = 1$$

Thus, only one value $\rho n$ exists, which satisfies the following expression.

$$\theta i = \frac{Tn}{Ti}(\rho n \cdot \Delta + \theta n) - iFiX\left[\frac{Tn}{Ti}(\rho n \cdot \Delta + \theta n)/\Delta\right]\cdot \Delta$$

FIG. 4 illustrates an embodiment derived from the process for detecting an absolute position shown in FIG. 3. For convenience of illustration, the numbers of teeth of the gear G(3), G(4) and G(5) are three (3), four (4) and five (5), respectively. A feed screw 67 for the X axis is directly connected to an output axle 66 of motor 49. A driven member 65 moves in the X direction shown by the arrow by rotation of the motor 49. An axle 52 which rotates with an output axle 66 of motor 49 extends upwardly in order to rotate with a rotary axle 53 of a resolver 56. The gear G(3) is provided on an axle 53A which extends from the rotary axle 53. Furthermore, resolvers 47 and 48 are provided in parallel to the resolver 46. A rotary axle 54 of resolver 47 is connected to an axle 54A of gear G(4) to rotate, which is engaged with the gear G(3). Similarly, a rotary axle 55 of resolver 48 is connected to an axle 55A of gear G(5) to rotate, which is in turn engaged with the gear G(4). The primary exciting coils of resolvers 46, 47 and 48 are connected to an exciting circuit 50 through lines 56, 57 and 58 to supply exciting current thereto, respectively. A selecting circuit 51 is connected to the exciting circuit 50 by lines 59 and 60. The selecting circuit 51 selectively supplies exciting current to the resolvers 46, 47 and 48 by way of a combination of selected signals $S_{EL0}$ and $S_{EL1}$. The secondary outputs of the resolvers 46, 47 and 48 are introduced into an isolator 45 through lines 62, 63 and 64, respectively. Output signal EN (enable signals) of the isolator 45 is introduced into a register 42 through a circuit including a filter and comparator 44.

Figure 8:
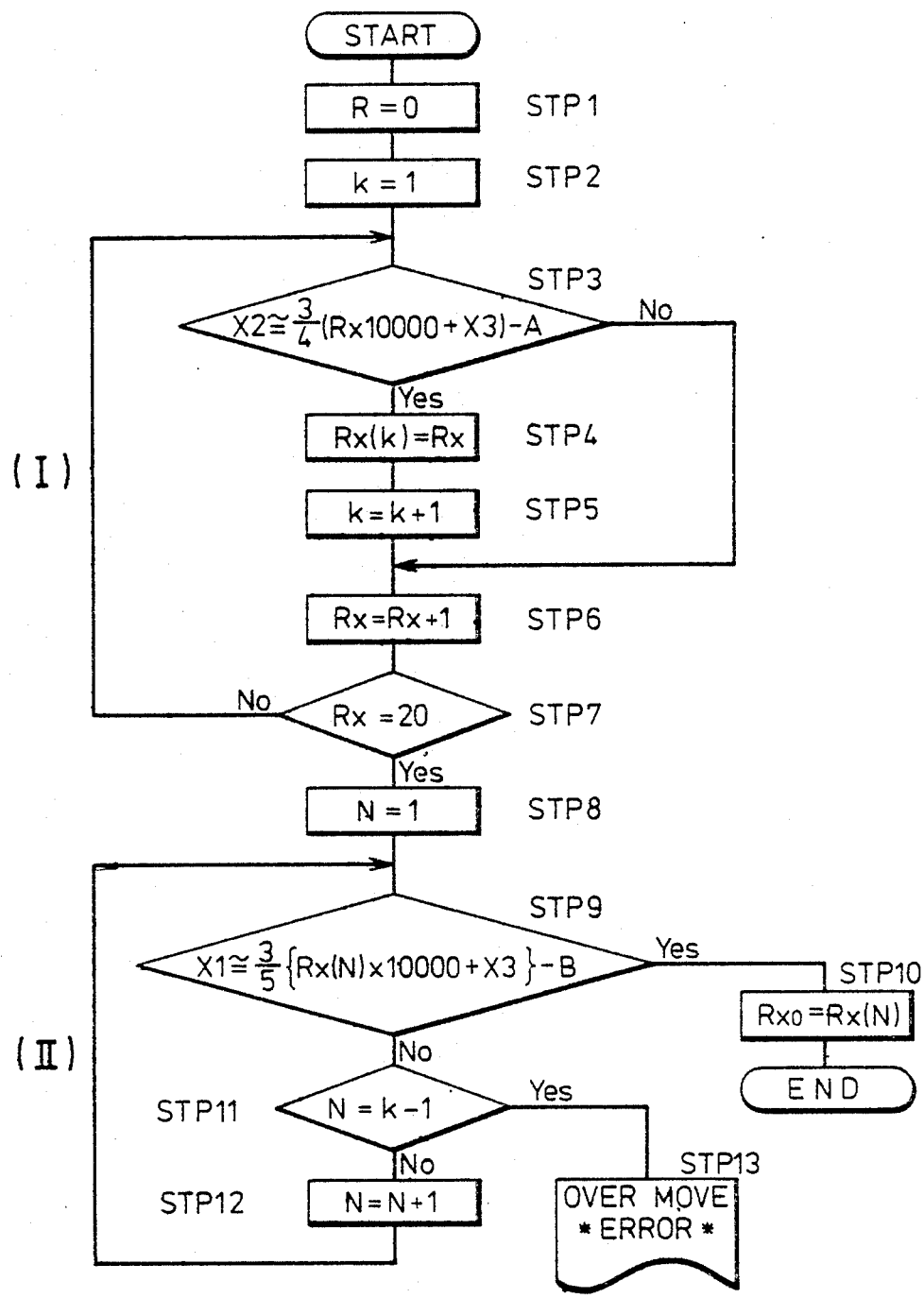
FIG. 8 is a flow chart illustrating data processing in the central processing unit shown in FIG. 4.

A counter 41 for 10,000 counts is connected to a central processing unit (CPU) 43 through register 42 so that the number counted by the counter 41 at the time when the signal EN is produced is fed into the CPU 43 by lines 65 and 66. The data fed into CPU 43 will be processed according to the following procedure as shown in FIG. 8. In the isolator 45, a terminal AG of the primary side indicates an analog ground whereas a terminal LG of the secondary side indicates a logic ground.

Figure 5:
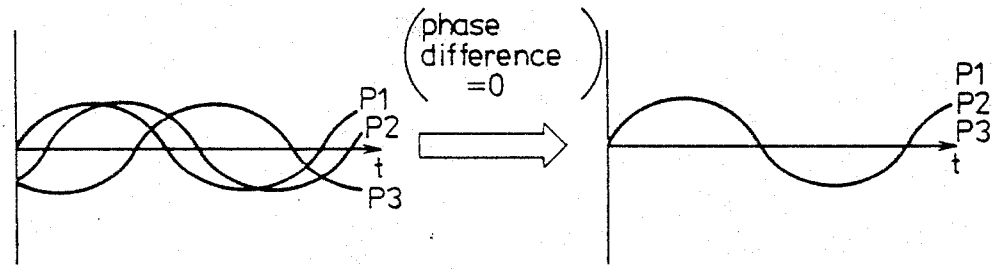
FIGS. 5a and 5b are diagrams illustrating an adjustment of phases of secondary outputs from resolvers shown in FIG. 4, FIGS. 6a and 6b are diagrams illustrating counting of a position collating counter and zero cross adjustment for the phases of the outputs from the resolver in FIG. 4.
Figure 6:
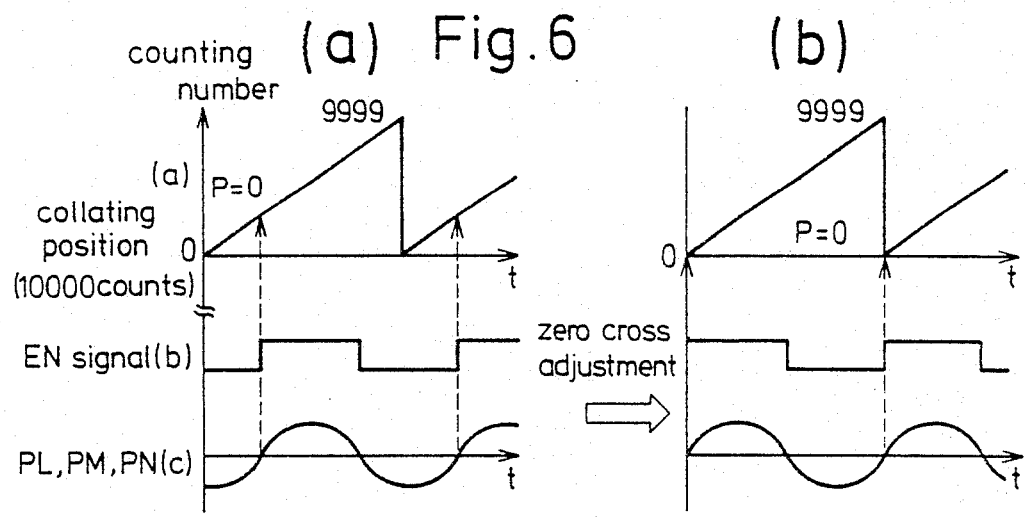
Figure 7:
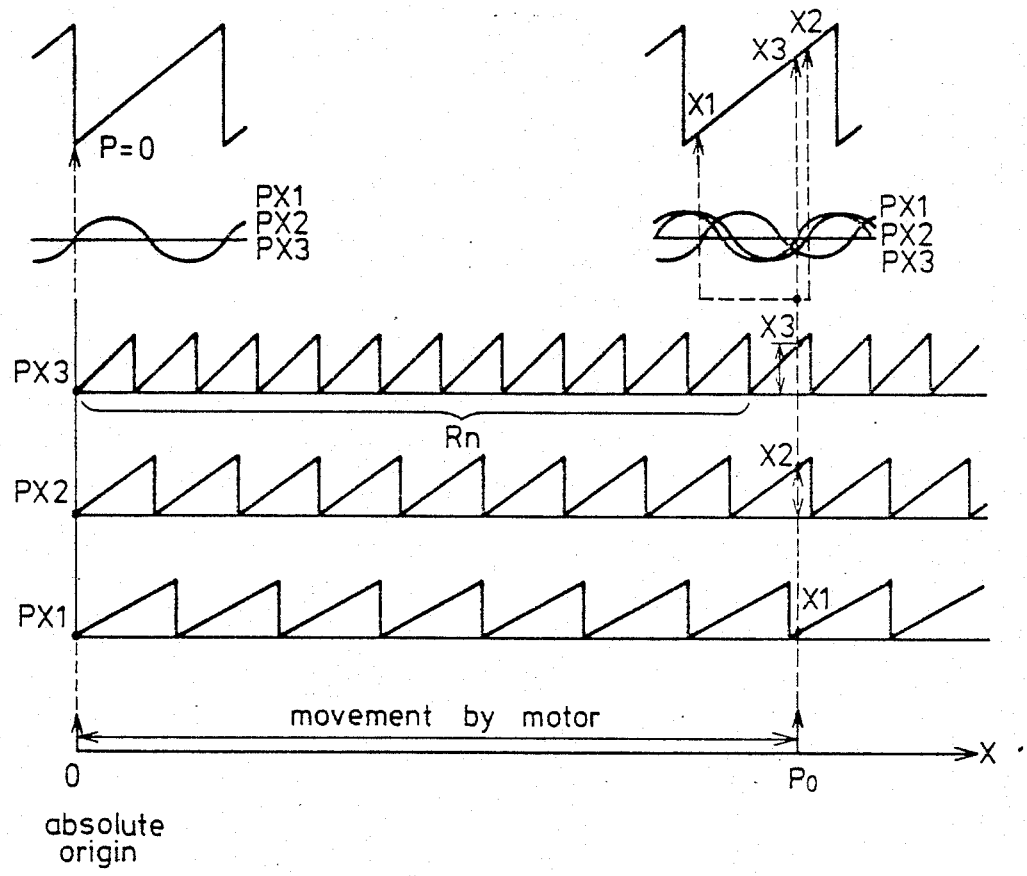
FIG. 7 is a diagram for waveforms illustrating a process of detecting an absolute position by the apparatus shown in FIG. 4.

FIGS. 5 through 7 illustrate transmission of signals from the resolvers 46, 47 and 48 to the register 42. FIG. 5a shows waveforms of the secondary outputs Px1, Px2 and Px3 of resolvers 46, 47 and 48, respectively, when exciting signals consisting of sine waves and cosine waves are simultaneously supplied to the resolvers above. FIG. 5b shows wave forms in which three (3) wave forms are in phase with each other by adjustment of their mechanical angles. FIG. 6a shows wave forms which indicate repeating of counts from zero (0) through 9999 by the counter 41 which runs as a collating position counter and can count 5 KHZ. FIG. 6a shows setting up signals of the register 42 i.e. EN signals in FIG. 4 which are fed from the filter and comparator 44. FIG. 6a finally shows waveforms of the secondary outputs of resolvers 46, 47 and 48. It is apparent from FIG. 6a that the setting up signals EN are formed at the time when the secondary output crosses the zero (0) level line in voltage. In FIG. 6a, the value counted by counter 41 is not zero (0) at the time when setting signal EN rises. However, the value counted by counter 41 shows zero (0) in the waveforms of FIG. 6b. That is, the value of collating position counter 41 i.e. zero (0) is set up in the register 42 at the rising point (or the falling point) of output signals (Px1, Px2, Px3) of resolver 46, 47 and 48 which have been adjusted to be in phase. This is called zero cross adjustment. The position obtained by the above procedure becomes the absolute origin.

FIG. 7 illustrates how to obtain the coordinates Po where the driven member 65 is stopped at the absolute coordinates Po in the predetermined X direction by rotation of motor 49 shown in FIG. 4. As shown in the upper right side of FIG. 7, the secondary wave forms Px1, Px2 and Px3 of resolvers 46, 47 and 48 are shifted in phase with respect to each other because of gear trains G(3), G(4) and G(5). The zero cross position of each signal is indicated by the symbols X1, X2 and X3, respectively. Each saw tooth waveform corresponding to the waveforms Px1, Px2 or Px3 in FIG. 7 corresponds to the top waveforms in FIGS. 6a and 6b, respectively. As shown by the waveform Px3, Px2 or Px1 in FIG. 7, the length of waveform Px3 is 3/5 of Px1 and the length of waveform Px2 is 4/5 of Px1. The height of each waveform indicates the count in register 42 so that one times the value of Px1, two times the value of Px2 and three times the value of Px3 are supplied to the CPU 43.

FIG. 8 illustrates a process for obtaining the absolute position based on the data X1, X2 and X3 supplied to the CPU 43 of FIG. 4.

As illustrated in FIG. 7, the absolute position Po is expressed by the following expression.

$$Po = Rx \cdot 10,000 + X3 \tag{26}$$

where Rx indicates the number of rotations, necessarily an integer, of the rotary axle of resolver 46, which is from the absolute origin to the position Po. The driven member 65 moves 10,000 μm per each revolution of gear G(3).

The data X2 obtained by the signal Px2 is determined by the following expression.

$$X2 = \frac{4}{5}(RX \cdot 10,000 + X3) - A \tag{27}$$

where $$A = iFix[\frac{4}{5}(Rx \cdot 10,000 + X3)/10,000] \cdot 10,000 \tag{28}$$

and iFix [a] indicates an integer of a. The data X1 obtained by the signal Px1 is determined by the following expression.

$$X1 = 3/5(Rx \cdot 10,000 + X3) - B \tag{29}$$

where $$B = iFiX[3/5(RX \cdot 10,000 + X3)/10,000] \cdot 10,000 \tag{30}$$

In the first (I) part of FIG. 8, the numbers of RX which satisfy the measured values X3 and X2 simultaneously are determined with regard to the expression (27). In the second (II) part of FIG. 8, the value of Rx0 which satisfies the measured value X1 is selected from the numbers of RX.

In the flow chart of FIG. 8, RX is set to be zero (0) in Step 1 (as abridged STP hereafter) and k is set to be one (1) in STP 2 in order to set up an initial condition where an operation starting signal is given after storing the measured data X1, X2 and X3 in the memory of CPU. In STP 3, is determined whether or not the expression (27) is solved, which is obtained by calculation of the expression (28) since the value of RX is given to be zero.

STP 4 sets Rx(k) where the judgment is YES in STP 3. Where the judgment is No therein, the process proceeds to STP 6. After STP 4, k is incremented by one in STP 5, and Rx is incremented by one in STP 6. Rx is checked to determine if it has reached its maximum number i.e. 20 which is given by the expression (24) and is the value obtained by the least common multiple 60 of the numbers of teeth 3, 4 and 5 divided by the number of teeth 3. STP 3 through STP 6 is repeated until RX reaches 20, i.e. No is decided in STP 7. During this process, the value Rx(k) and k are defined through STP 4 and STP 5, respectively, where the expression (27) is solved. STP 8 sets up N=1 as the initial value when YES is decided in STP 7.

The value B is calculated by the expression (30) in STP 9 and, it is confirmed that the expression (29) is solved. STP 10 follows YES in STP 9. In STP 10, the value Rx(N) is set up as Rxo. An absolute position Po will now be obtained by substituting Rxo for Rx of the expression (26). FIG. 8 shows only up to the choice of Rxo.

STP 11 confirms that the value N is equal to the value K−1. The value k is the last i.e. the largest value which is defined in STP 5 of the first part (I) of the flow chart. STP 12 increments the value N by one following YES in STP 11. That is, the value Rx (1), Rx(2), ... Rx(k), i.e. from a small value to a large value, all of which satisfy the value x3 and x2 of the expression (27) simultaneously, are designated in STP 9. STP 13 follows YES in STP 11 to indicate existence of an error in the measuring system. This means that the expression (29) is still not solved even where the largest value Rx(k) is entered thereinto after checking the value Rx from N=1 in order in STP 9, i.e. it is not in a normal measuring condition.

In the meanwhile, the above process for data processing is effective to work out an accurate absolute position where the expressions (27) and (29) are approximately solved. The reason for the above will be illustrated as follows.

The embodiment in FIG. 4 shows the resolvers 46, 47 and 48 of which one revolution results in one cycle, respectively. Thus, the effective detecting range from the absolute origin will be determined by the following expression where K is set to be equal to 3, 4 and 5 and Tn is set to be equal to 3 in the expression (24).

$$En = \frac{LCM\{3, 4, 5\}}{3} = \frac{60}{3} = 20 \text{ (revolutions)}$$

This means that the motor 49 in FIG. 4 rotates less than 20 revolutions. As illustrated above, one revolution of motor 49 corresponds to 10,000 μm so that twenty (20) revolutions thereof correspond to two hundred mm, since $$20(\text{revolutions}) \times 10000 \, (\mu m/\text{rev.}) = 200,000 \, \mu m$$
$$= 200 \, mm$$

Figure 9:
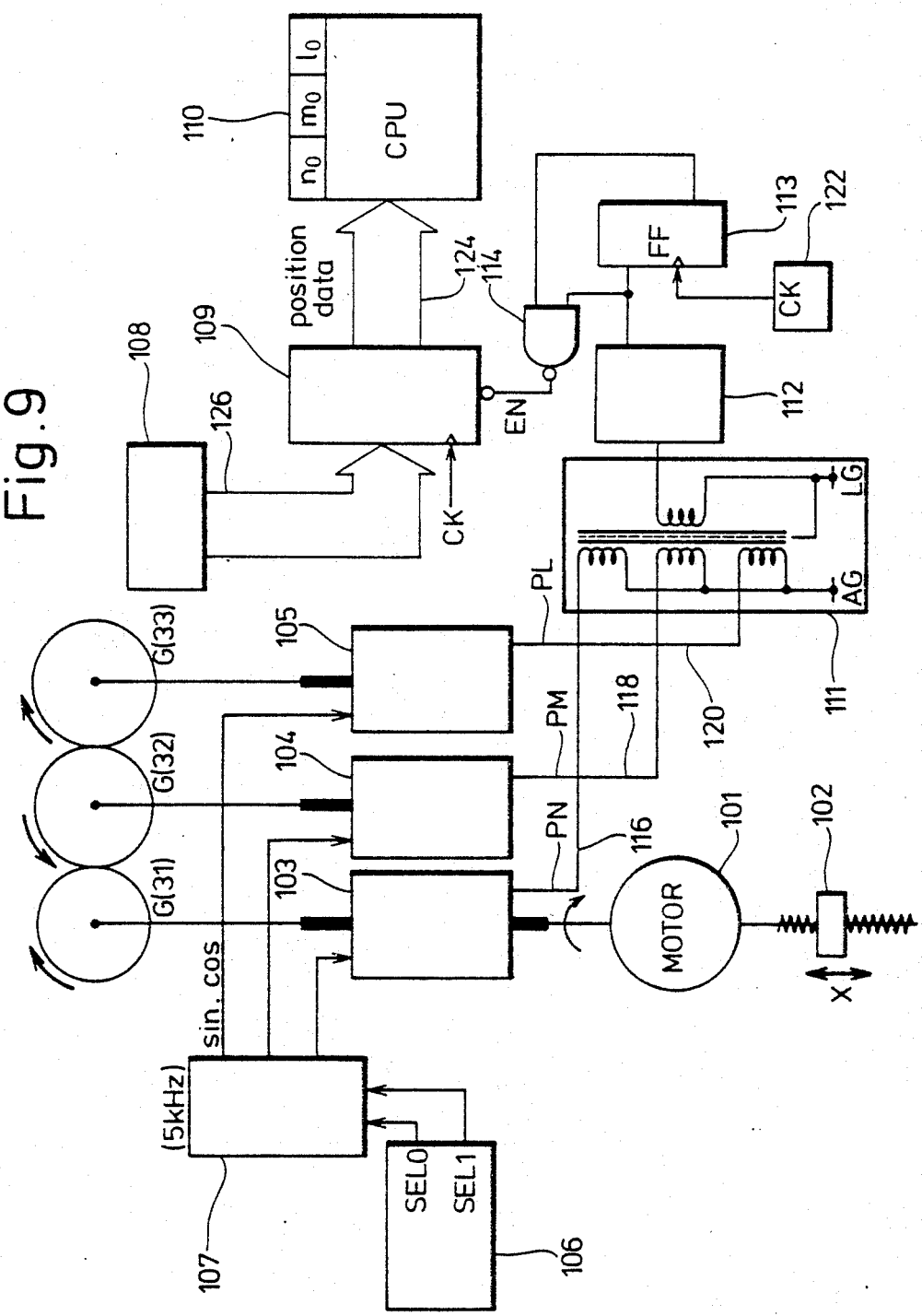
FIG. 9 is a block diagram of another embodiment of the present invention which shows a preferred absolute position detecting apparatus compared to that of FIG. 4.

A preferred embodiment is illustrated in FIG. 9 in which the effective detecting range is two thousand (2000)mm.

The configuration shown in FIG. 9 is similar to that of FIG. 4. However, the following differences exist between FIGS. 4 and 9. That is, the resolvers 103, 104 and 105 are of the type which include ten (10) poles and the counter 108 is for 200 counts. Further, the gears G(31), G(32) and G(33) include the number of teeth 31, 32 and 33, respectively. Furthermore, outputs of filter and comparator 112 are clocked into a flip flop circuit 113 by clock signal CK from a clock pulse generator 122 to become EN signals (enable signals) for a register 109 through a NAND gate 114.

Figure 10:
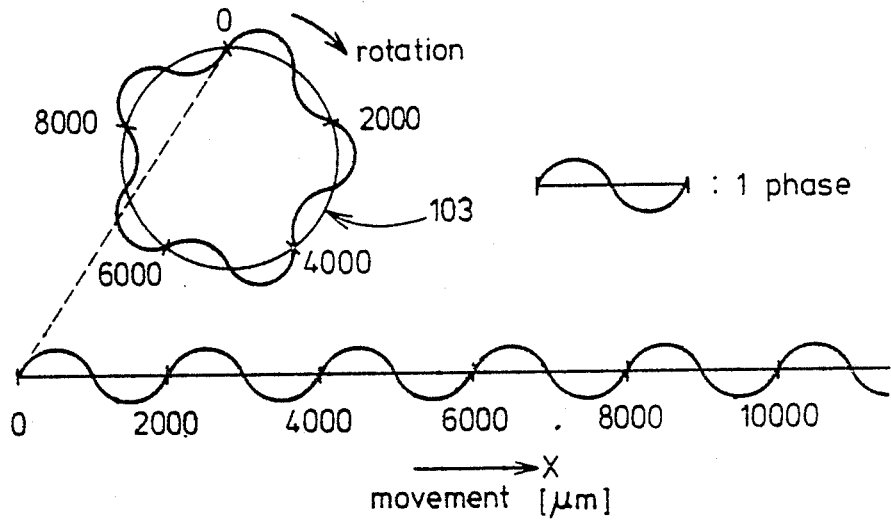
FIG. 10 is a diagram illustrating the function of a resolver with ten (10) poles as shown in FIG. 9, FIGS. 11a and 11b are diagrams illustrating zero cross adjustment of three (3) resolvers with ten (10) poles in FIG. 9.
Figure 11:
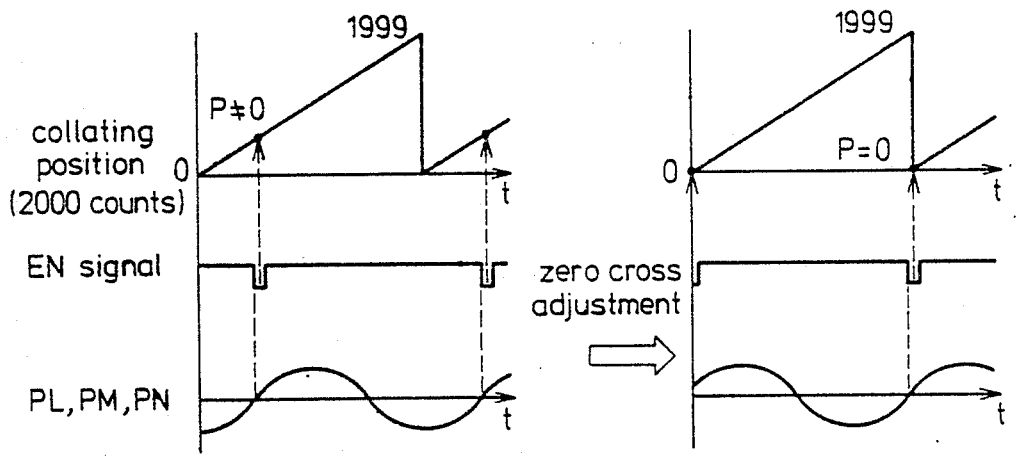

Suppose that a driven member 102 moves 10,000 μm in the X axis direction while a motor 101 rotates one revolution as in FIG. 4. As a result, the resolver 103 which includes ten (10) poles makes five (5) cycles of phase shift during its one revolution. Each period thereof corresponds to two thousand (2000)μm as illustrated in FIG. 10. Two thousand counts of counter 108 corresponds to one period of the resolver 103. FIG. 11(a) shows the waveforms before adjustment of absolute origin whereas FIG. 11(b) shows them after adjustment. FIG. 11(a) shows the difference between the zero point of counter 108 and the zero cross point of the secondary output waveforms of the resolvers 103, 104 and 105, respectively, whereas FIG. 11(b) shows coincidence between the content of counter 108 and the zero cross point of the secondary output waveforms. In this case, a pulse signal EN is adopted as an instructing signal in order to feed the content of counter 108 to register 109.

Figure 12:
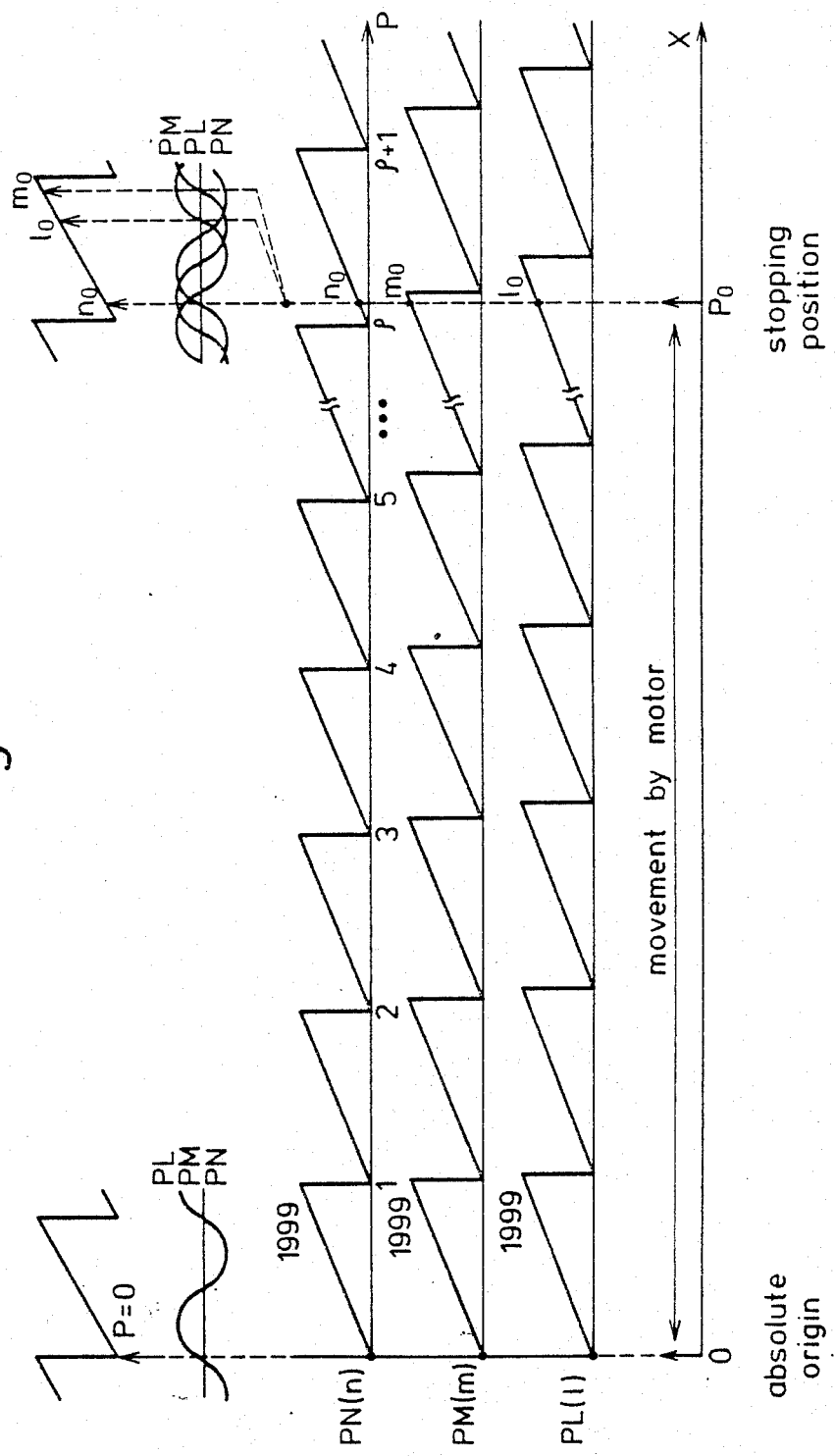
FIG. 12 is a diagram for waveforms illustrating a process of absolute position detection in FIG. 9.

FIG. 12 illustrates a measuring process for an absolute position detecting device as in FIG. 9. In FIG. 12, suppose that the driven member 102 is initially located at the absolute origin under the condition that the resolvers 103, 104 and 105 and counter 108 are adjusted and then driven member 102 moved to the point Po. Under this condition, the resolvers 103, 104 and 105 output signals no, mo and lo, respectively.

Thus, the absolute position P0 will be determined as follows, with reference to FIG. 12.

$$Po = 2000p + no \tag{31}$$

$$p = Rn \times 5 \tag{32}$$

where Rn indicates the revolution number (an integer) of the resolver 103.

Regarding resolver 104, the following expression is solved.

$$G(31):G(32) = 31:32$$

Thus, the output mo of resolver 104 is as follows.

$$mo = \frac{31}{32}(2000p + no) - C \tag{33}$$

$$C = iFiX\left[\frac{31}{32}(2000p + no)/2000\right] \cdot 2000 \tag{34}$$

Regarding resolver 105, the following expression is solved.

$$G(31):G(33) = 31:33$$

Thus, the output lo of resolver 105 is as follows.

$$lo = \frac{31}{33}(2000p + no) - D \tag{35}$$

$$D = iFiX\left[\frac{31}{33}(2000p + no)/2000\right] \cdot 2000 \tag{36}$$

Accordingly, the value $p$ will be obtained by putting the figures 0, 1, 2, ..., (1056−1) successively into the expressions (33) and (34). After that, the only value of $p$ will be obtained as the value $p_0$, which satisfies the expressions (35) and (36). Then, the value $po$ is substituted into the expression (31) in order to obtain the absolute position Po.

Figure 13:
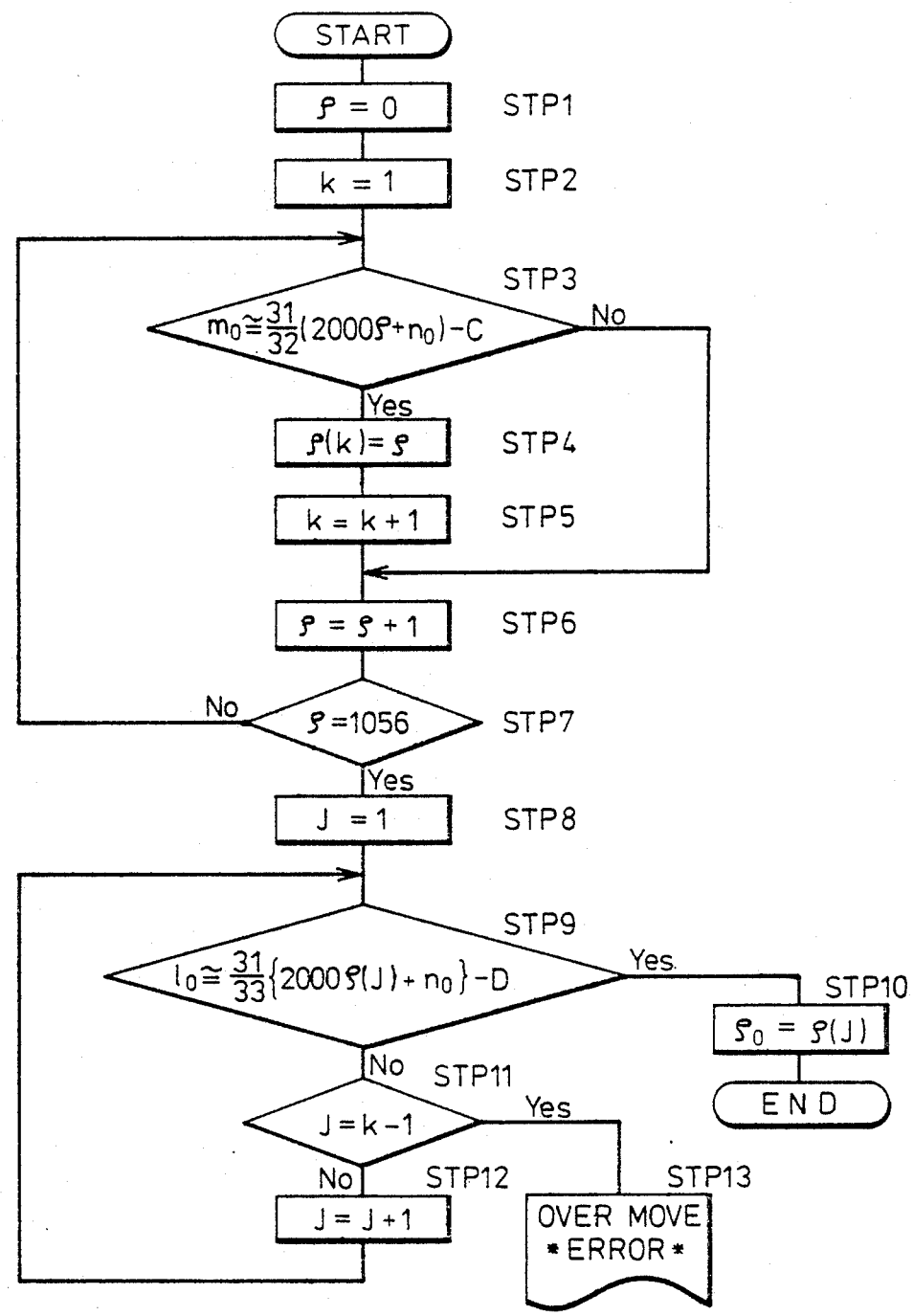
FIG. 13 is a flow chart illustrating a process of data processing in the central processing unit shown in FIG. 9.

The flow chart shown in FIG. 13 is divided into two parts. The first part of FIG. 13 shows a process to select the values $p$, of which more than one will exist and satisfy the expressions (33) and (34) simultaneously, while the second part of FIG. 13 shows a process to select the value $p_0$ out of the values $p$ which are obtained in the first part. The flow chart in FIG. 13 shows a process which is basically similar to that of FIG. 8. The differences between the two flow charts are as follows. That is, Rz→$p$, X3→no, N→J, X2→mo, X1→lo, A→C, B→D, Rxo→$po$, Rx(N)→$p$(J). Thus, a detailed explanation of each step of the flow chart will be omitted.

The following is an illustration of the effective detecting range.

The expression below defines the range detected by the detecting device shown in FIG. 9.

Suppose that any absolute position P is set up, $$P = 2000p + n \tag{37}$$
$$= 5 RN$$

$$m = \frac{31}{32}(2000p + n) - C \tag{38}$$

$$C = iFiX\left[\frac{31}{32}(2000p + n)/2000\right] \cdot 2000$$

$$l = \frac{31}{33}(2000p + n) - D \tag{39}$$

$$D = iFiX\left[\frac{31}{33}(2000p + n)/2000\right] \cdot 2000$$

where l, m and n indicate measured position data at any position P.

Suppose that the values of data l, m and n are to be zero including the absolute origin, from the expressions (38) and (39), $$0 = \frac{31}{32}(2000p) - iFiX\left[\frac{31}{32}p\right] \cdot 2000 \tag{40}$$

$$0 = \frac{31}{33}(2000p) - iFiX\left[\frac{31}{33}p\right] \cdot 2000$$

Accordingly, $$0 = \frac{31}{32}p - iFiX\left[\frac{31}{32}p\right] \tag{41}$$

$$0 = \frac{31}{33}p - iFiX\left[\frac{31}{33}p\right]$$

Functions F and G are introduced into the expressions (41) which will be changed as indicated below.

$$F(p) = \frac{31}{32}p - iFiX\left[\frac{31}{32}p\right] \tag{42}$$

$$G(p) = \frac{31}{33}p - iFiX\left[\frac{31}{33}p\right] \tag{43}$$

Figure 14:
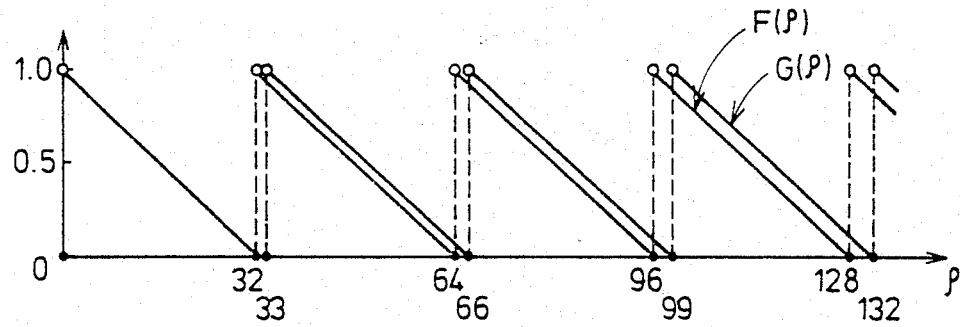
FIG. 14 is a diagram illustrating a process for calculating that position data is zero in FIG. 9.

F($p$) and G($p$) are shown in FIG. 14. Thus, with regard to FIG. 14, the solutions of F($p$)=0, G($p$)=0 are obtained as follows.

$$pF = 32\ \alpha \tag{44}$$

$$\rho G = 33\beta \quad (45)$$

where, $\alpha$ and $\beta$ are zero (0) or a positive integer. Now, suppose that $\rho F$ is equal to $\rho G$, $32\alpha$ is equal to $33\beta$.

$$\alpha = \frac{33}{32}\beta$$

$$\therefore \beta = 32\gamma, \alpha = 33\gamma$$

where $\gamma$ is zero (0) or a positive integer.
Accordingly, $$\rho F = \rho G = = \cdot 33\gamma = 1056\gamma$$

where the values $\alpha$ and $\beta$ are substituted into the expressions (44) and (45). That is, regarding $\rho$, the cases that position data become zero are as follows.

$$\gamma = 0 \; \rho = 0 \text{ (absolute origin)}$$
$$\gamma = 1 \; \rho = 1056$$
$$\gamma = 2 \; \rho = 2112$$
$$\gamma = 3 \; \rho = 3168$$

Accordingly, the effective detecting range Pmax ($=2000\,\rho\text{max}+n\text{max}$) is given by the expression below.

$$\rho max = \rho F - 1 = 1055$$
$$nmax = 1999$$

Thus, $$Pmax = 2000 \times 1055 + 1999 = 2,111,999$$
$$(\mu m) \approx 2000(mm)$$

where $\gamma$ is equal to zero.

The following is an illustration for determining errors in measurement.

The illustration above regarding FIG. 9 relates to a process in which errors for data lo, mo and no measured are excluded. However, in practice, these measured data lo, mo and no include errors due to quantization which are involved in electrical resolving power and mechanical errors from the gear train. Thus, the measured values are different from the theoretical values.

The following illustrates the range of errors.

Positioning data l, m and n which are measured corresponding to the absolute position P from each of resolvers 103, 104 and 105 of FIG. 9, are indicated as follows, $$l = lT + \Delta l \quad (46)$$

$$m = mT + \Delta m \quad (47)$$

$$n = nT + \Delta n \quad (48)$$

where lT, mT and nT indicate accurate values, while $\Delta l$, $\Delta m$ and $\Delta n$ indicate errors, respectively.

Thus, the expressions (33) and (34) are modified as follows.

$$mT + \Delta m = \frac{31}{32}(2000\rho + nT + \Delta n) - C \quad (49)$$

$$C = iFiX\left[\frac{31}{32}(2000\rho + nT + \Delta n)/2000\right] \cdot 2000 \quad (50)$$

where mT is determined as follows.

$$mT = \frac{31}{32}(2000\rho + nT) - iFiX\left[\frac{31}{32}(2000\rho + nT)/2000\right] \cdot 2000 \quad (51)$$

Accordingly, the error $\Delta m$ obtained by substituting the value mT of the expression (51) for the value mT of the expression (49) is calculated by the expression below.

$$\Delta m = \frac{31}{32} \cdot \Delta n - e \quad (52)$$

$$e = iFiX\left[\frac{31}{32}(2000\rho + nT + \Delta n)/2000\right] \cdot 2000 - iFiX\left[\frac{31}{32}(2000\rho + nT)/2000\right] \cdot 2000 \quad (53)$$

Thus, the value e is equal to 0 or 2000.

$$\Delta m = \frac{31}{32} \cdot \Delta n - \begin{Bmatrix} 0 \\ 2000 \end{Bmatrix} \quad (54)$$

Similarly, $$\Delta l = \frac{31}{33} \cdot \Delta n - \begin{Bmatrix} 0 \\ 2000 \end{Bmatrix} \quad (55)$$

Suppose that the error due to quantization is $\epsilon$, which value is $1(\mu m/\text{pulse})$, the mechanical error is $\delta$, which value is $2(82\,m/\text{pulse})$ and $\Delta n$ includes the value $\epsilon$ and $\delta$, all of which are substituted in the expressions (54) and (55), then $$[\Delta m]^* \approx \frac{31}{32}(1 + 0.926)[\Delta n]$$

$$\approx 1.866\,[\Delta n]$$

$$[\Delta l]^* \approx \frac{31}{33}(1 + 0.926)[\Delta n]$$

$$\approx 1.809\,[\Delta n]$$

suppose that [n] is $\pm 1$, then $$[\Delta m]^* = \pm 1.866(\mu m) \quad (56)$$

$$[\Delta l]^* = \pm 1.809(\mu m) \quad (57)$$

where $[\Delta Q]$ is defined as the actual error pulse number and $[\Delta Q]^*$ is defined as the actual error quantity.

Corresponding to the value $\rho o$ which is determined by successive steps of the flow chart shown in FIG. 13, $$[\Delta n] = \pm 1,$$

and the following conditions are necessary.
Regarding the value mo, $$<mT-1.866> \leq mo \leq 1999 \quad (58)$$

or $$<mT+1.866> \geq mo \geq 0 \quad (59)$$

or $$mT-1.866 \leq mo \leq mT+1.866 \quad (60)$$

Regarding the value lo, $$<lT-1.809> \leq lo \leq 1999 \quad (61)$$

or $$<lT+1.809> \geq lo \geq 0 \quad (62)$$

or $$lT-1.809 \leq lo \leq lT+1.809 \quad (63)$$

where
$<S>$ is defined, when $S \geq 0$, as $$S - iFiX[s/2000] \cdot 2000$$

or
$<S>$ is defined, when $S<0$, as $$2000+S$$

Each of the expressions (58) through (60) will be selected corresponding to the measured value mo which is in the range from zero (0) to 1999. For example, the expression (58) will be selected where the value mo is close to and less than the value 1999. The expression (59) will be chosen where the value mo is close to zero (0). Furthermore, the expression (60) will be selected where the value mo is in the middle of the values zero (0) and 1999. Similarly, one of the expressions (61), (62) and (63) is chosen corresponding to the value lo. Briefly speaking, the expressions (58) through (60) and the expressions (61) through (63) will not be solved where each of the measured data mo and lo include a value greater than the errors $(\epsilon+\delta)$ in the detecting device shown in FIG. 9, which is given in the form of a numeral.

Further, for instance, the value mT is necessary in order to solve the expression (58) which is an inequality. The value mT will be calculated by the expression (51) under the condition that nT is determined to be nearly equal to no (nT no) in the expression (51) and ρo, which is determined in the flow chart of FIG. 13, is substituted for ρ. Furthermore, the following inequalities (58A) through (63A) can be adopted since all of the values lo, mo and no are integers.

That is, the expression (58) corresponds to the following.

$$iFiX[<mT-1.866>] \leq mo \leq 1999 \quad (58A)$$

The expression (59) corresponds to the following.

$$iFiX[<mT-1.866>] \geq mo \geq 0 \quad (59A)$$

The expression (60) corresponds to the following.

$$iFiX[mT-1.866] \leq mo \leq iFiX[mT+1.866] \quad (60A)$$

The expression (61) corresponds to the following.

$$iFiX[<lT-1.809>] \leq lo \leq 1999 \quad (61A)$$

The expression (62) corresponds to the following.

$$iFiX[<lT+1.809>] \geq lo \geq 0 \quad (62A)$$

The expression (63) corresponds to the following.

$$iFiX[lT-1.809] \leq lo \leq iFiX[lT+1.809] \quad (63A)$$

The capability for miscalculation of an accurate absolute position is illustrated below, which is based on the existence of errors as indicated above.

Figure 15:
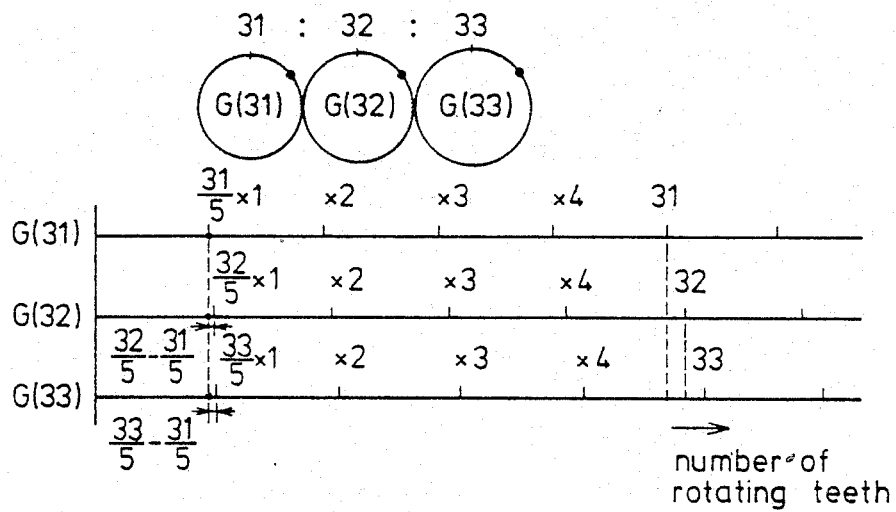
FIG. 15 is a diagram illustrating measured phase lag for the apparatus of FIG. 9.

As shown in FIG. 15, the ratio of teeth numbers of each gear is $$31:32:33$$

Further, each resolver 103, 104 and 105 includes ten (10) poles, respectively.

Thus, where the gear G(32) rotates at 1/5 revolution after the gear G(31) continues to rotate in the same direction more than 1/5 revolution from the position at absolute origin, the number of pulses dm produced by rotation of the gear G(31) is calculated by the expression below.

$$dm = \left(\frac{32}{5} - \frac{31}{5}\right) \cdot \frac{10000}{32} \simeq 62.5$$

Similarly, the number of pulses dl of the gear G(33) to the gear G(31) is calculated by the following expression.

$$dl = \left(\frac{33}{5} - \frac{31}{5}\right) \cdot \frac{10000}{33} \simeq 121.2$$

Thus, $$[\Delta m] << dm, \, [\Delta l] << dl \quad (64)$$

This means that ρo will become accurate where the expression (64) is satisfied even if there are errors $\Delta m(=1.866)$ and $\Delta l(=1.809)$ in the measured data lo and mo, and the data lo and mo including the errors are utilized when ρo is determined in the flow chart of FIG. 13. That is, ρo is not subject to the influence of errors. Further, the absolute position is determined by the following expression when ρo is decided.

$$Po = 2000 \rho o + no$$

i.e. ρo is not affected by errors in the gear train since the values mo and lo are not used. In other words, in the expression of STP 3 in FIG. 13, the value of the right portion thereof will be changed by 62.5 as ρ is increased by one (1) so that errors will not be made when ρ satisfying the value mo is clocked since the errors of mo are not comparable to the value 62.5. The same applies to (J) and lo of STP 9.

Thus, from another point of view, there are no problems even if the values mo and lo include errors therein when $p$ of STP 3 and $p(J)$ of STP 9 are determined correctly i.e. gears which are roughly worked will be able to be used and furthermore, the lives of gears will be increased even if they become gradually deteriorated in accuracy.

Resolvers of the rotary type are illustrated in FIGS. 4 and 9 as detectors. However, in the present invention, any type of detectors can be utilized provided that the detectors have a regular period and the absolute quantities thereof such as lo, mo and no are able to be measured within one period. That is, detectors of the linear type like inductsyn (trademark) and magnetic scale can be utilized. Resolvers are not even limited to the rotary type.

Furthermore, systems for processing the measured data are illustrated in FIGS. 8 and 13. However, the systems are not limited to the described embodiments. For instance, the expressions (1), (2) and (3) can be solved as simultaneous equations.

In the present invention, three (3) resolvers for measuring are activated by one motor which is used to move a member to be measured as illustrated in FIGS. 4 and 9. However, one of the resolvers can be removed by using signals from a detector for position feed back already provided in feeding controllers, such as a resolver, rotary encoder or the like fixed in a machining tool. As illustrated in FIG. 16, resolvers 207, 208 and 209 for the detector are connected to the axles of pulse motors PM1, PM2 and PM3 in order to be rotated. In this case, the gear train is not necessarily provided. Instead, the number of pulses P($\Delta$X) corresponding to movement $\Delta$X provided by a NC unit for the machining tool will be supplied to the pulse motor 203. Further, the number of pulses P(31/32·$\Delta$X) will be supplied to the pulse motor 204 and still furthermore, the number of pulses P(31/32·$\Delta$X) will be supplied to pulse motor 205. Accordingly, the movement $\Delta$X will be supplied to a pulse proportioner.

In FIG. 16, a gear train 212 can be used instead of part 206 of pulse motors 204 and 205. In the embodiment of FIG. 16, movement of the driven member is electrically transmitted to resolvers etc. instead of being mechanically transmitted so that the limited space in a machine tool will be more effectively used for fixing of resolvers therein. Further, in FIG. 16, the pulse motors 203, 204 and 205 are used. However, a synchro is provided on the axle of motor 101.

The process of the present invention, which can determine the absolute position from a combination of measured data from detectors having a plurality of periods, is almost free from measuring errors since there is no weighting factor among measured data from the detectors. Thus, the moment of inertia in the gear train can be decreased and it is not necessary to correct errors due to attrition of gears. Further, as apparent from the embodiments in FIGS. 9 and 13, the absolute position is determined by two steps, one of which sets $po$ and the other of which determines Po by using $po$ such as $Po=2000po+no$. That is, the absolute position is obtained at high accuracy since mechanical errors of the gear train are not included in no. Furthermore, the detecting device itself can be smaller in size with longer life. The numbers of teeth of gears have no common divisors as illustrated in FIGS. 4 and 9, so that the effective detecting range of the device is increased remarkably.

While the invention has been particularly shown and described with respect to a preferred embodiment thereof, it will be understood by those in the art that various changes in form and detail may be made therein without departing from the spirit and scope of the invention.

What is claimed is:

1. An apparatus for detecting an absolute position of a moving member as measured from a reference position, comprising:

means for detecting mechanical movement of said member with a plurality of detectors each producing a periodical electrical signal in response to mechanical movement of said member, said electric signals having periods different from each other;

means for digitally storing values derived from said electric signals obtained from said detecting means when said member is stopped; and means for determining a relative position between one of said detectors and said member by summing a first value, representing the multiplication of an integer N by a first period corresponding to said one of said detectors, and a second value corresponding to the periodic electrical signal obtained from said one of said detectors and being less than said first period, said second value being stored in said storing means, wherein the integer N is determined by using at least a second period and a third value corresponding to the periodic electrical signal obtained from another detector of said detecting means, said third value being less than said second period and being stored in said storing means.

2. An apparatus for detecting an absolute position according to claim 1, wherein said determining means includes means for calculating said absolute position by adding said first value to said second value.

3. An apparatus for detecting an absolute position according to claim 1, wherein said detecting means includes a position detector of the linear type.

4. An apparatus for detecting an absolute position according to claim 1, wherein said detecting means includes a position detector of the rotary type.

5. An apparatus for detecting an absolute position according to claim 1, wherein said detecting means comprises a combination of position detectors of the linear type and the rotary type.

6. An apparatus for detecting an absolute position according to claim 1, wherein said detecting means generate phase modulation signals.

7. An apparatus for detecting an absolute position according to claim 6, wherein said detecting means includes a change-over means for selecting the application of exciting signals to each of said detectors.

8. An apparatus for detecting an absolute position according to claim 1, further including a transmitting mechanism of the rotary type with an axle and gear train for transmitting said movement to said detectors.

9. An apparatus for detecting an absolute position according to claim 8, wherein said transmitting mechanism of a rotary type includes a plurality of gears in which the number of teeth have no common divisor.

10. An apparatus for detecting an absolute position according to claim 1, further including an activating means of the type which rotates electrically for transmitting said movement to said detectors.

11. An apparatus for detecting an absolute position according to claim 10, wherein said activating means comprises a pulse motor.

12. An apparatus for detecting an absolute position according to claim 10, wherein said activating means comprises a synchro.

13. An apparatus for detecting an absolute position according to claim 1, further include a mechanism of the rotary type with an axle and gear train and an activating means of the type which rotates electrically for transmitting said movement to said detectors.

14. An apparatus for detecting an absolute position according to claim 1, wherein said storing means includes a counter counting a predetermined number in a predetermined time interval, and a register storing data from said counter which corresponds to said electrical signal.

15. An apparatus for detecting an absolute position according to claim 1, wherein said integral value determining means includes a computer in which incremental processing is performed to determine said integer number N.

16. An apparatus for detecting an absolute position according to claim 1, wherein the smallest period of one of said detectors compared with another period of another detector is selected to calculate an absolute position.

17. A process for detecting an absolute position of a moving member using a plurality of detectors generating signals with different periods, comprising the steps of:
preparing a detecting means having a plurality of detectors which generate periodical electric signals corresponding to predetermined mechanical movements of said member, the periods of the electrical signals obtained from each of said detectors being different from each other;
generating said mechanical movement between said detecting means and said member;
digitally storing in memory means said electric signals corresponding to the respective periods of each detector;
specifying a relative position representing said mechanical movement between one of the detectors and said member by summing a first value, representing the multiplication of an integer N by a first period corresponding to the electrical signals obtained from said one of said detector, and a second value corresponding to the electrical signals obtained from said one of said detectors and which is less than said first period and is stored in said memory means; and
determining said integer N by using a second period corresponding to the electrical signals obtained from another detector of said detecting means and a third value corresponding to the electrical signals from said another detector, which third value is less than said second period and is stored in said memory means.

18. A process for detecting an absolute position according to claim 17, wherein said integral value N is determined by a ratio of said second period to said first period and said third value.

19. A process for detecting an absolute position according to claim 17, wherein to obtain the integer N, the smallest period of said one detector compared with another period of another detector is selected to calculate an absolute position.

20. A process for detecting an absolute position according to claim 17, wherein the absolute value P is obtained by substituting the decided value N into the following expression $$P = N \cdot l_1 + \Delta l_1$$

where P is set to indicate a relative positional relationship between said member and one of said detectors, $l_1$ is set to indicate a period corresponding to another detector different from said one detector, $\Delta l_1$ is set to indicate a measured value being stored corresponding to said corresponding period and N is set to indicate an integral value.

21. A process for detecting an absolute position according to claim 17, further comprising the step of:
confirming that measured data being stored in said memory means is within a predetermined range of errors.

22. A process for detecting an absolute position of a moving member, comprising the steps of:
preparing a transmitting means of a rotary type which includes a plurality of rotary detectors generating periodic electric signals in response to rotary angle ranges of one revolution or equally divided portions thereof, and axles rotating said detectors at a predetermined ratio; connecting said rotary transmitting means to said moving member;
supplying mechanical movement between said rotary detector and said moving member under a predetermined condition;
storing in memory means said electric signals corresponding to a respective rotational period of each said detector;
specifying a relative positional relationship between said moving member and one of said detectors by using an integer N multiplied by a first period corresponding to the electric signals obtained from said one of said detectors and a second value corresponding to the electric signals obtained from said one of said detectors which is less than one period thereof; and
determining said integer N by using a second period corresponding to the electric signals obtained from another detector and a stored third value derived from the electric signals obtained from said another detector.

23. A process for detecting an absolute position according to claim 22, wherein said integer N is determined by using a ratio of said second period to said first period and said stored third value.

24. A process for detecting an absolute position according to claim 22, wherein the absolute value P is obtained by substituting the determined value N into the following expression $$P = N \cdot l_1 + \Delta l_1$$

where P is set to indicate a relative positional relationship between said member and said one detector, $l_1$ is set to indicate a period corresponding to said another detector $\Delta l_1$ is set to indicate a measured value being stored corresponding to said corresponding period, and N is set to indicate an integral value.

25. A process for detecting an absolute position according to claim 22, wherein one detector axle which rotates at the highest rotation ratio is connected to said moving member.

26. A process for detecting an absolute position according to claim 22, further comprising the step of:

confirming that measured data being stored in said memory means is within a predetermined range of errors.

27. A process for detecting an absolute position according to claim 22, further comprising the step of: selecting the smallest period of said one detector to obtain said integer N rather than a period of another detector for computing an absolute position.

* * * * *